United States Patent [19]

Post et al.

[11] 3,994,456
[45] Nov. 30, 1976

[54] STEERED LATERAL COURSE TRANSITION CONTROL APPARATUS FOR AIRCRAFT AREA NAVIGATION SYSTEMS

[75] Inventors: William C. Post, Scottsdale; Edmond E. Olive, Phoenix, both of Ariz.

[73] Assignee: Sperry Rand Corporation, New York, N.Y.

[22] Filed: May 29, 1975

[21] Appl. No.: 581,987

[52] U.S. Cl. .......................... 244/189; 235/150.27; 343/7 ED
[51] Int. Cl.² ........................................... B64C 13/20
[58] Field of Search ............. 73/178 R; 235/150.22, 235/150.26, 150.27; 244/77 A, 77 B, 77 E, 179, 184, 189; 318/585; 343/6 R, 6 DF, 7 ED, 107, 112 C

[56] References Cited
UNITED STATES PATENTS

| | | |
|---|---|---|
| 3,635,428 | 1/1972 | Nelson et al. .................... 244/77 A |
| 3,739,382 | 6/1973 | Younkin ....................... 244/77 A X |
| 3,786,505 | 1/1974 | Rennie ....................... 235/150.27 X |
| 3,788,579 | 1/1974 | Sliney .............................. 244/77 A |
| 3,848,114 | 11/1974 | Campbell et al. ............... 235/150.26 |

Primary Examiner—Stephen G. Kunin
Attorney, Agent, or Firm—Howard P. Terry; Albert B. Cooper

[57] ABSTRACT

Control apparatus for an aircraft area navigation system computes a predetermined curved path from the inbound course to the outbound course of a waypoint or the inbound course to the next waypoint and provides aircraft steering signals with regard to the predetermined curved path. A bank angle bias command is applied to the apparatus for effecting transition from the inbound course to the curved path and is removed when the aircraft transitions from the curved path to the outbound course. Cross track and track angle error signals are generated with regard to the predetermined curved path for steering the aircraft thereon as the course transition is effected.

21 Claims, 5 Drawing Figures

STEERED LATERAL COURSE TRANSITION CONTROL APPARATUS FOR AIRCRAFT AREA NAVIGATION SYSTEMS

BACKGROUND OF THE INVENTION

1. Field of the Invention

The invention generally relates to aircraft area navigation systems, particularly with regard to effecting lateral transitions with regard to the waypoints of the flight plan.

2. Description of the Prior Art

Aircraft area navigation systems, hereinafter referred to as RNAV, are known in the prior art that transition the aircraft from the inbound course or leg of a waypoint to the next leg thereof by merely switching from the first track to the next at a predetermined distance from the waypoint and permitting the steering signals to capture the next leg by either manual pilot control through the flight director or by applying the steering signals to the automatic flight control system. This prior art procedure, particularly in the automatic mode, provides an exponential capture of the next track utilizing a blend of cross track deviation and track angle error. Since the prior art approach assumes the absence of non-linearities such as roll attitude limits (unrestricted bank angle commands) and, in practice, the bank angle commands are necessarily limited for safety and passenger comfort, undesirable overshooting or hunting (S turning) of the next leg results thereby utilizing an excessive amount of air space in a relatively uncontrolled manner. Additionally, at the point of leg switching large deviation signals are generated which result in presenting an undesirable large deviation indication and a sudden shift in the commanded heading to the human pilot via the flight instruments. When the displayed deviation is at or near its maximum value, the pilot is unable to maintain cognizance of the aircraft position. Although this prior art track transitioning technique has satisfied aviation regulatory agency present day requirements with regard to aircraft spacing when transitioning from one course to another, potential precise future requirements of "guidance around corners" with regard to aircraft spacing will not be so satisfied.

SUMMARY OF THE INVENTION

A predetermined curved path is computed from one leg to the next leg in an RNAV system and steering signals are generated with regard to the curved path to guide the aircraft therealong. A bank angle bias command is utilized in defining the curved path during the leg transition. Cross track and track angle error signals are generated with regard to the curved path. These signals may be applied to the automatic flight control system and/or to the flight instruments to effect automatic control and to apprise the human pilot of the aircraft attitude and position with regard to the curved path so that corrective action may be effected.

Thus it is appreciated that the aforedescribed disadvantages of the prior art technique are eliminated in a manner to be clarified hereinafter.

DESCRIPTION OF THE PREFERRED EMBODIMENTS

Figure 1:
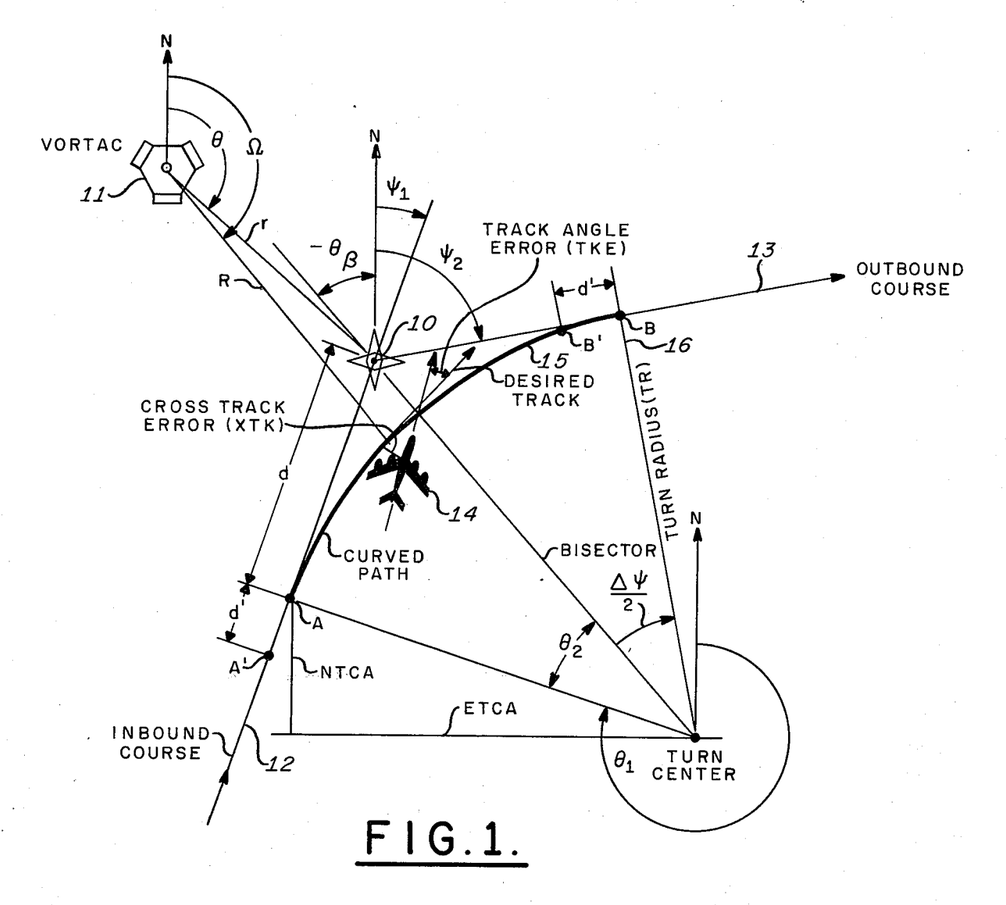
FIG. 1 is a diagram illustrating geometrical parameters with regard to the curved transition path from an inbound course to an outbound course at a waypoint.
Figure 2:
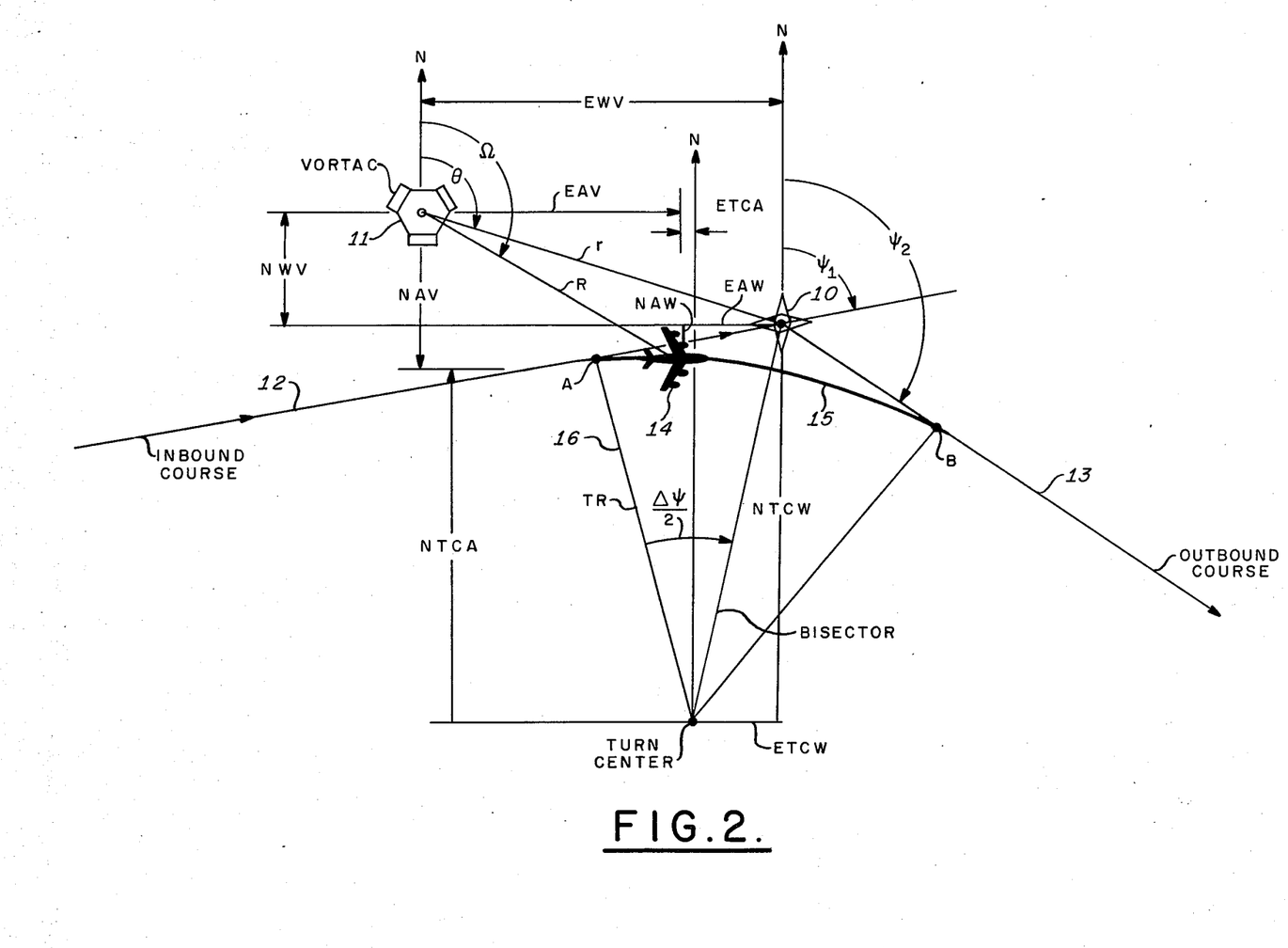
FIG. 2 is a diagram similar to FIG. 1 illustrating further geometrical parameters.

Referring to FIGS. 1 and 2, the lateral navigation parameters associated with transitioning from the inbound course to the outbound course of a waypoint of an RNAV system is illustrated. A waypoint 10 whose geographical location is determined in a well known manner by the $r$, $\theta$ coordinates with respect to a VORTAC 11 has an inbound course 12 and an outbound course 13 associated therewith. The inbound and outbound courses 12 and 13 with respect to north are designated as $\psi_1$ and $\psi_2$ respectively. The geographical location of an aircraft 14 is determined from the VORTAC 11 in a conventional manner by the R, $\Omega$ coordinates illustrated. The north and east components of the locations of the waypoint 10, the VORTAC 11 and the aircraft 14 with respect to each other are also illustrated. For example, the north and east coordinates of the aircraft 14 with respect to the VORTAC 11 are indicated in FIG. 2 as NAV and EAV respectively. Similarly the north and east coordinates of the waypoint 10 with respect to the VORTAC 11 are designated as NWV and EWV respectively. Furthermore, NAW and EAW designate the north and east coordinates of the aircraft 14 with respect to the waypoint 10.

In accordance with the invention, a curved path 15 is generated along which to fly the aircraft 14 to effect a smooth and controlled transition from the inbound course 12 to the outbound course 13. Preferably the curved path 15 is circular and tangential to the inbound and outbound courses at points A and B respectively. A maximum aircraft bank angle for the transition is determined as a function of aircraft ground speed and angular difference between the inbound and outbound courses. With the bank angle determined, a turning radius 16 for the curved path 15 is established in accordance with the maximum bank angle and the aircraft ground speed. The distance d is then determined which locates the point A on the inbound course 12 and in combination with the turn radius 16 locates the turn center for the curved path 15.

In order for the aircraft 14 to fly the path 15, the maximum bank angle is established at point A with the aircraft returning to zero bank angle at point B. However, since the aircraft 14 cannot be rolled into and out of the maximum bank attitude instantaneously, the associated roll command is applied and removed at points A' and B' respectively. The distances $d'$ from the points A' and B' are determined from considerations of passenger comfort and aircraft roll response in accordance with the specific aircraft to which the invention is applied.

With the aircraft 14 at the commanded bank angle at point A, the craft heading rate maintains the aircraft on the curved path 15 in an idealized calm air environment. However, due to winds, velocity changes, trim conditions, and the like, the aircraft 14 will deviate from the curved path 15. In order to correct for these deviations the cross track error (XTK) and the track angle error (TKE) with respect to the curved path 15 are generated to steer the aircraft and provide pilot displays in a manner to be described. For ease of illustration with regard to FIG. 1, the aircraft 14 is often considered to be located at point A. Thus the north and east coordinates of the aircraft 14 with regard to the turn center are designated as NTCA and ETCA respectively. Similarly, NTCW and ETCW designate the north and east components of the turn center with respect to the waypoint 10.

Figure 3:
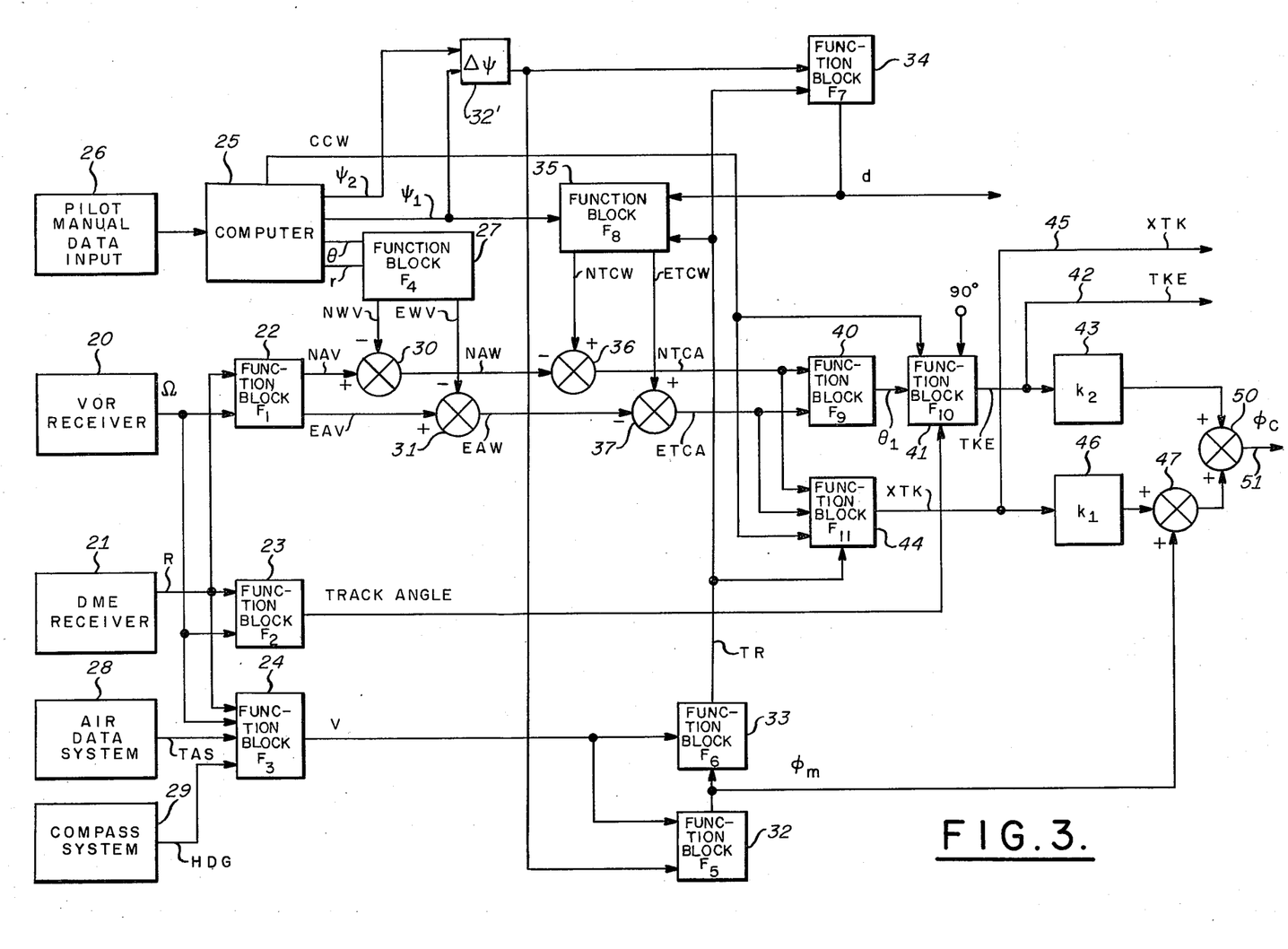
FIG. 3 is a schematic block diagram of curved transition path generation and control apparatus for an aircraft area navigation system instrumented in accordance with the invention.

Referring to FIG. 3 with continued reference to FIGS. 1 and 2, a schematic block diagram of apparatus for generating the curved path 15 and for controlling the aircraft 14 to fly therealong in transitioning from the inbound course to the outbound course of the waypoint 10, is illustrated. The apparatus of FIG. 3 includes a plurality of function blocks that may be implemented by any of a variety of well known devices. For example, the function blocks may be instrumented by special purpose discrete analog or digital circuits or may alternatively be implemented by general purpose digital computation apparatus.

A VOR receiver 20 provides the VOR bearing $\Omega$ and a DME receiver 21 provides the DME distance R in response to the signals from the VORTAC 11. The distance and bearing data are applied to a function block 22 wherein a well known coordinate conversion function $F_1$ converts the VOR and DME data to the north and east coordinates, NAV and EAV respectively, of the aircraft with respect to the VORTAC 11. Circuits for providing the function $F_1$ are well known in the art and will not be described further herein for brevity. The VOR and DME data are also applied to function blocks 23 and 24 wherein conventional circuitry implementing functions $F_2$ and $F_3$ provide the track angle and the ground speed V respectively of the aircraft 14. It will be appreciated that aircraft heading (HDG) from a conventional compass system 29 and true airspeed (TAS) from a conventional air data system 28 may be utilized as inputs to the function block 24 thereby generating a current and accurate value of the ground speed V. The function $F_3$ of the block 24 may be implemented as disclosed in U.S. patent application Ser. No. 465,228 filed Apr. 29, 1974 in the names of Donald H. Baker and Larry J. Bowe entitled "Radio Navigation System" and assigned to the assignee of the present invention which is now U.S. Pat. No. 3,919,529.

The apparatus of FIG. 3 also includes a computer 25 for storing the navigational data with regard to the flight plan of the aircraft. For example, the computer 25 may be preloaded prior to a particular flight with the geographical locations of all of the waypoints along the flight plan as well as the locations of the associated VORTACs. The computer is arranged in a conventional manner to provide the required data as the aircraft executes the flight plan with regard to the sequentially encountered waypoints. For example, with the aircraft on the inbound course 12 of the waypoint 10, the computer 25 provides the pre-stored inbound and outbound courses $\psi_1$ and $\psi_2$ respectively for the waypoint 10 as well as the bearing $\theta$ and distance r of the waypoint 10 with respect to the VORTAC 11. The computer 25 also provides a control signal CCW in accordance whether the turn from the inbound course 12 to the outbound course 13 is clockwise or counterclockwise.

The computer 25 receives signals from a pilot manual data input device 26 by which the pilot may alter the data stored in the computer 25 or may enter new data therein. The device 26 may, for example, be implemented as a conventional alphanumeric and discrete data keyboard entry device for providing the data to the computer 25 in a well known manner. The device 26 may be utilized, for example, when the pilot wishes to deviate from the flight plan as stored in the computer 25.

The bearing and distance data ($\theta$, r) of the waypoint 10 with respect to the VORTAC 11 is applied to a function block 27. The block 27 in a well known manner instruments a conventional coordinate conversion function $F_4$ for converting the $\theta,r$ data to the north and east coordinates NWV and EWV respectively of the waypoint with regard to the VORTAC. The signals NAV from the block 22 and NWV from the block 27 are applied to an algebraic summing device 30 to provide the north coordinate NAW of the aircraft 14 with respect to the waypoint 10. Similarly, the EAV signal from the block 22 and the EWV signal from the block 27 are applied to an algebraic summing device 31 to provide the east coordinate EAW of the aircraft 14 with respect to the waypoint 10.

The inbound and outbound course signals $\psi_1$ and $\psi_2$ from the computer 25 are applied to a function block 32' that computes the function $\Delta\psi = \psi_2 - \psi_1$. The $\Delta\psi$ signal from the function block 32' as well as the ground speed signal V from the function block 24 are applied to a function block 32. The function block 32 provides the maximum desired bank angle $\phi_m$ in accordance with a functional relationship $F_5$ of the track change $\Delta\psi = \psi_2 - \psi_1$ and the ground speed V. The desired bank angle $\phi_m$ is determined substantially as the pilot would from aircraft speed and the magnitude of the heading change. The faster the aircraft is moving, the lower the desired bank angle should be to provide a "smooth" ride. The larger the required heading change, the steeper the desired bank angle should be for practical reasons. The bank angle command $\phi_m$ is applied at point A' (FIG. 1) such that the aircraft will have assumed the bank angle when it reaches point A, thus causing the craft to execute the curved path 15 in a manner to be described.

Figure 4:
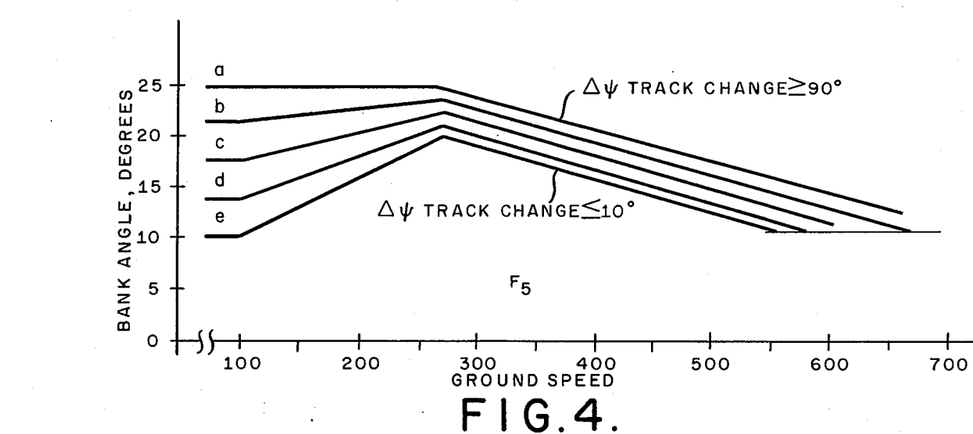
FIG. 4 is a graph depicting the functional relationship of desired bank angle with regard to ground speed and track change angle.

It will be appreciated that the functional relationship $F_5$ implemented by the block 32 is selected in accordance with the particular characteristics of the aircraft in which the system is installed. Referring to FIG. 4, typical functional relationships suitable for use in modern jet transports are illustrated. Functional relationship lines a, b, c, d and e represent track changes of $\geq$ 90°, 70°, 50°, 30° and $\leq$ 10° respectively. The functional relationships of FIG. 4 are readily implemented by such conventional devices as storage tables, diode matrices and the like. It will be appreciated that the block 32 is responsive to the signal $\Delta\psi = \psi_2 - \psi_1$ from the block 32' and this difference signal together with the ground speed V from the block 24 addresses the function generating apparatus to provide the associated value $\phi_m$ as illustrated in FIG. 4.

Referring again to FIG. 3, the bank angle signal $\phi_m$ from the block 32 and the ground speed signal V from the block 24 are applied to a function block 33 to generate the turn radius (TR) 16 (FIG. 1) for the circular path 15 in accordance with a function $F_6$ as follows:

$$F_6 = TR = \frac{V^2}{g \tan \phi_m}$$

where $g$ is the gravity constant. As previously described, it is appreciated that the function $F_6$ is readily instrumented by any of a variety of suitable and well known analog and digital circuits.

The $\Delta\psi$ signal from the function block 32' as well as the turn radius signal TR from the function block 33 are applied to a function block 34 to generate a signal $d$ in accordance with the distance between the point A and the waypoint 10 of FIG. 1. The distance d is generated in accordance with a function $F_7$ as follows:

$$F_7 = d = TR \text{ TAN } \frac{\Delta\psi}{2}$$

where, as previously discussed, $\Delta\psi = \psi_2 - \psi_1$. The block 34 is implemented in any convenient manner in accordance with the function $F_7$ as discussed above with regard to the block 33.

The $\psi_1$ signal from the computer 25, the turn radius TR signal from the function block 33 and the d signal from the function block 34 are applied to a function block 35 to generate the north and east coordinates of the turn center location with respect to the waypoint 10 as illustrated in FIG. 2, in accordance with a function $F_8$ as follows:

$$F_8 = \begin{cases} NTCW = -d \cos \psi_1 - TR \sin \psi_1 \\ ETCW = -d \sin \psi_1 + TR \cos \psi_1 \end{cases}$$

The block 35 is implemented in any convenient manner as described above with respect to the block 33.

The NTCW signal from the block 35 and the NAW signal from the algebraic summing device 30 are combined in an algebraic summing device 36 to provide the NTCA north coordinate of the aircraft location with respect to the turn center. In a similar manner, an algebraic summing device 37 combines the ETCW signal from the block 35 with the EAW signal from the algebraic summing device 31 to provide the ETCA coordinate signal of the aircraft location with respect to the turn center. The NTCA and ETCA signals are applied as inputs to a function block 40 wherein the quantity $\theta_1$ as illustrated in FIG. 1 is generated in accordance with a function $F_9$ as follows:

$$F_9 = \theta_1 = TAN^{-1} \frac{NTCA}{ETCA}$$

where $\theta_1$ represents the angular position of the aircraft on the curved path 15.

The track angle signal from the function block 23, the CCW signal from the computer 25 and the $\theta_1$ signal from the function block 40, as well as a constant signal representing 90° are applied to a function block 41 to generate the track angle error TKE in accordance with a function $F_{10}$ as follows:

$$F_{10} = \begin{cases} TKE = (\theta_1 - 90°) - \text{TRACK ANGLE for CCW turns} \\ TKE = (\theta_1 + 90°) - \text{TRACK ANGLE for CW turns} \end{cases}$$

The TKE signal is applied to a line 42 as well as to a gain block 43. The gain block 43 applies a gain $k_2$ to the TKE signal in a well known manner, the gain being selected and conventionally adjusted in accordance with the aircraft characteristics and velocity.

The CCW signal from the computer 25, the turn radius signal TR from the function block 33, the NTCA signal from the summing device 36 and the ETCA signal from the summing device 37 are applied to a function block 44 for generating the cross track error signal XKT in accordance with a function $F_{11}$ as follows:

$$F_{11} = \begin{cases} XTK = \sqrt{NTCA^2 + ETCA^2} - TR \text{ for CCW turns} \\ XTK = TR - \sqrt{NTCA^2 + ETCA^2} \text{ for CW turns} \end{cases}$$

The XKT signal is applied to a lead 45 as well as to a gain block 46 which inparts a gain $k_1$ to the XKT signal in a manner similar to that described with respect to the block 43. The gain adjusted XTK signal from the block 46 is combined with the $\phi_m$ signal from the block 32 in an algebraic summing device 47. The output of the algebraic summing device 47 and the gain adjusted TKE signal from the block 43 are combined in an algebraic summing device 50 to provide the system steering signal $\phi_c$ on a lead 51. The $\phi_c$ signal may be expressed as follows:

$$\phi_c = \phi_m + k_1 \text{ XTK} + k_2 \text{ TKE}$$

Preferably the steering signal $\phi_c$ on the lead 51 is applied to the roll channel of the aircraft automatic flight control system and also to the lateral steering cue of the attitude director indicator of the flight director system of the craft. The track angle error signal TKE on the lead 42 is preferably applied to the commanded heading bug of the horizontal situation indicator instrument of the aircraft while the cross track error signal XTK on the lead 45 is applied to the lateral deviation indicator of the horizontal situation indicator.

In operation, when the aircraft reaches the point A' (FIG. 1) as indicated by the signal $d$ from the block 34 and the above discussed predetermined value of $d'$, aircraft control is switched by conventional means not shown from the straight line control apparatus for the inbound course 12 (FIG. 1) to the curved path control apparatus of FIG. 3. The $\phi_m$ signal from the block 32 applied via elements 47 and 50 to the lead 51 causes the aircraft to assume the bank angle $\phi_m$ at the point A. The bank angle $\phi_m$ then causes the craft to endeavor to turn about the turn center as determined by the NTCA and ETCA signals from the elements 36 and 37 respectively with a turn radius TR as determined by the block 33. When the craft is on the curved path 15 the track angle error signal on the lead 42 and the cross track error signal on the lead 45 are both zero and thus the steering command $\phi_c$ is equal to the bank angle command $\phi_m$ which tends to maintain the craft on the curved path 15 by maintaining the craft banked at the angle $\phi_m$. When the craft departs from the curved path 15, due for example to transients such as wind and the like or aircraft configuration changes, the combination of the track angle error from the block 41 and the cross track error signal from the block 44 combined in the steering command $\phi_c$ tend to steer the aircraft back to the curved path 15.

When the craft reaches the point B' (FIG. 1) as determined from the computed value of $d$ and the predetermined value of $d'$ as discussed above, aircraft control is switched by means not shown from the curved path control apparatus of FIG. 3 to the straight line control apparatus with regard to the outbound course 13 and thus the aircraft rolls back to wings level flight by the time it reaches point B, completing the transition from the inbound course 12 to the outbound course 13 of the waypoint 10.

It will be appreciated that since the cross track error from the block 44 is applied via the lead 45 to the lateral deviation cue of the horizontal situation indicator (HSI) and since the error is computed with respect to the curved path 15 as the aircraft executes the course transition, it is merely necessary that the pilot maintains the lateral deviation indicator centered in order to make good the desired curved path. Similarly, since the track angle error from the block 41 is applied via the lead 42 to the commanded heading bug of the HSI and the error is computed with respect to the curved path 15, the commanded heading bug remains centered under the index of the HSI as the craft executes the course transition along the curved path 15. The turn rate of the craft along the curved path 15 is displayed to the pilot by reason of the compass card of the HSI slewing under the commanded heading bug at a rate equal to the turning rate of the craft until the new course is achieved at point B of FIG. 1. Thus the present invention guides the aircraft in making turns by utilizing the same steering laws and outputs as when flying straight tracks and, additionally, permits consistent HSI display rules. Thus it is appreciated that the HSI displays to the pilot a clear and uninterrupted presentation of the system performance throughout the transition.

Figure 5:
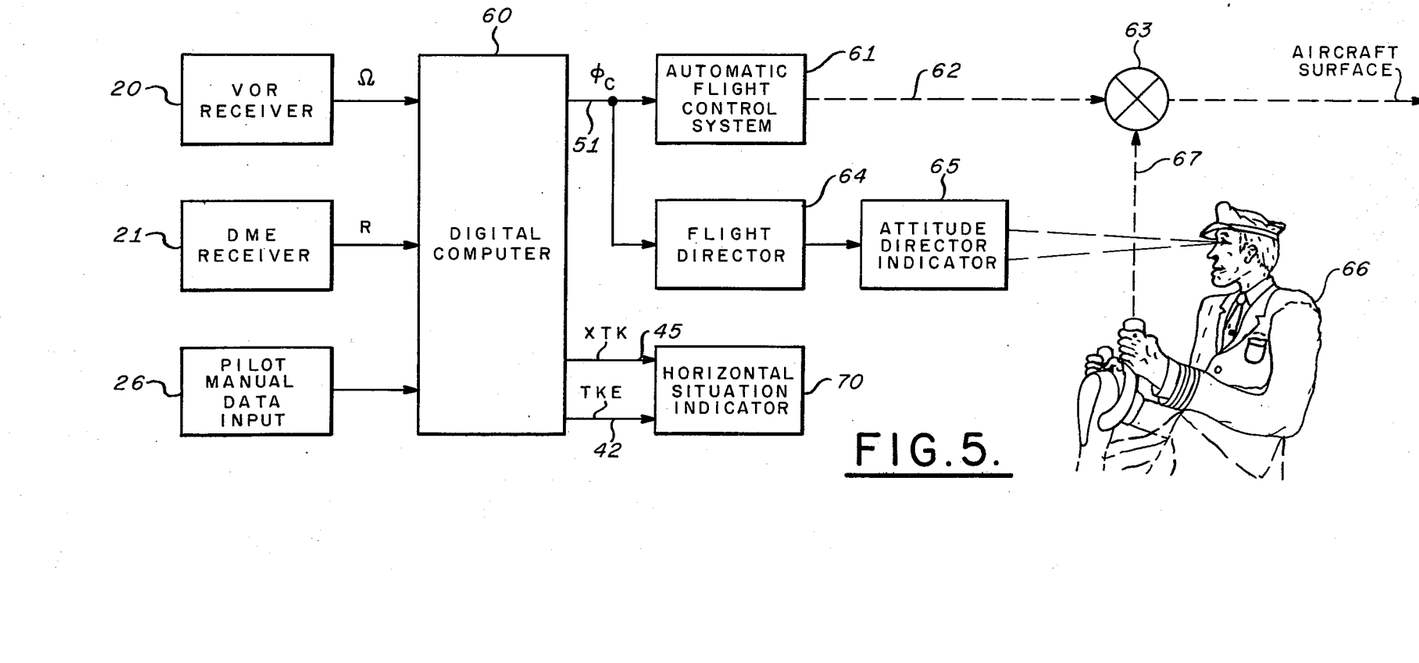
FIG. 5 is a schematic block diagram of an alternative embodiment of the invention.

Referring now to FIG. 5 in which like reference numerals indicate like components with respect to FIG. 3, an alternative embodiment of the invention is illustrated. The VOR receiver 20, the DME receiver 21 and the pilot manual data input device 26 provide inputs to a programmed general purpose digital computer 60, the data inputs from the blocks 20, 21 and 26 being similar to those described above with respect to FIG. 3. It will be appreciated that conventional analog-to-digital converters (not shown) may be utilized at the input interface of the computer 60 where appropriate. The computer 60 is programmed to provide the track angle error signal TKE, the cross track error XTK and the steering signal $\phi_c$ on the leads 42, 45 and 51 respectively, the nature and purposes of these signals having been previously described with respect to FIG. 3.

The computer 60 is programmed in a conventional and well known manner to provide the NAV, EAV, track angle and ground speed (V) signals as described above from the VOR and DME data. Additionally, in a manner similar to that described above with regard to the computer 25 of FIG. 3, the computer 60 stores the $\psi_1, \psi_2, \theta, r$ and CCW data with regard to the VORTACs and waypoints of the flight plan. These data may also be altered and supplemented by the pilot manual data input device 26 in the manner previously described. The computer 60 is furthermore programmed in a conventional and well known manner to provide the NWV and EWV signals from the $\theta$ and $r$ data stored therein.

With the above described parameters internally available, the compuer 60 is programmed to provide the $\phi_c$, the XTK and the TKE signals in accordance with the following program chapin chart:

---

PROGRAM CHAPIN CHART

$$NAW = NAV - NWV$$
$$EAW = EAV - EWV$$
$$\Delta\psi = \psi_1 - \psi_2$$
$$\phi_m = f(V, \Delta\psi)$$
$$TR = \frac{V^2}{g \tan \phi_m}$$
$$d = TR * TAN \frac{\Delta\psi}{2}$$
$$NTCW = -d*\cos\psi_1 - TR*\sin\psi_1$$
$$ETCW = -d*\sin\psi_1 + TR*\cos\psi_1$$
$$NTCA = NTCW - NAW$$
$$ETCA = ETCW - EAW$$
$$\theta_1 = TAN^{-1} \frac{NTCA}{ETCA}$$

True        CCW = 1?        False
$XTK = \sqrt{NTCA^2 + ETCA^2} - TR$    $XTK = TR - \sqrt{NTCA^2 + ETCA^2}$
$TKE = (\theta_1 - 90°) - TRACK\ ANGLE$    $TKE = (\theta_1 + 90°) - TRACK\ ANGLE$
$$\phi_c = \phi_m + k_1 * XTK + k_2 * TKE$$

---

As is known to those skilled in the art, the program chapin chart represents a convenient format, similar to the familiar program flow chart, for organizing the details of the computations to be performed preparatory to coding by the programmer. It will furthermore be readily appreciated by those skilled in the art that coding is generated in a routine manner from the above chapin chart in any convenient programming language associated with the computer utilized and will not be further described herein for brevity. It will be appreciated that the $\phi_m$ data is computed in a manner similar to that described above with regard to the function block 32 of FIG. 3. It will furthermore be appreciated that the digital values of $\phi_c$, XTK and TKE are converted by conventional digital-to-analog devices (not shown) to provide the associated analog signals as required.

The steering signal $\phi_c$ is applied to the roll channel of the automatic flight control system (AFCS) 61 of the aircraft to steer the craft along the curved path 15 of FIG. 1. Accordingly, the output of the AFCS 61 is applied through appropriate linkages 62 and a mechanical summing device 63 to control the aircraft roll attitude surfaces. The steering signal $\phi_c$ is also applied to the aircraft flight director 64 which includes the conventional attitude director indicator 65 with the roll command signal $\phi_c$ being applied to the lateral steering cue of the attitude director indicator 65. In a conventional manner the pilot 66 applies manual control signals via appropriate controls and linkages 67 to steer the aircraft along the curved path 15 by maintaining the lateral steering cue of the attitude director indicator 65 centered in a well known manner.

The cross track error signal XTK on the lead 45 and the track angle error signal TKE on the lead 42 are applied to the horizontal situation indicator (HSI) 70 of the aircraft. The cross track error signal is applied to the lateral deviation bar and the track angle error signal is applied to the commanded heading bug of the HSI 70. It will be appreciated that the pilot 66, in addition to his being appraised of the horizontal situation of the aircraft by observation of the instrument 70, may also utilize the displayed information to steer the aircraft along the curved path 15 of FIG. 1 via the controls and linkages 67. For example, by maintaining the commanded heading bug centered under the HSI index and maintaining the lateral deviation bar centered, the aircraft is steered to make good the curved path 15.

It will be appreciated from the foregoing that the elements of the above described embodiments of the invention that generate the turn center, turn radius and $\theta_1$ parameters comprise means for generating a curved path with respect to the inbound and outbound courses of the waypoint. It will furthermore be appreciated that the elements for generating the cross track and track angle errors as well as the steering signal $\phi_c$ comprise means for generating deviation signals with regard to the curved path for steering the aircraft therealong.

It is appreciated from the foregoing that by utilizing the present invention during leg switching in an RNAV system, the aircraft is guided through the transition using the normal piloting techniques associated with straight line flight. The cross track error and track angle error are computed with respect to the curved path and are utilized in computing the bank command $\phi_c$ for the AFCS and the flight director. Since utilizing the track angle and cross track errors with respect to the curved path would result in a zero bank command when the aircraft is making good the path, the bank bias command signal $\phi_m$ is mixed with the computation at the point A' assuring that the aircraft maintains the proper bank angle when making good the desired curved path. The bank bias is removed at the point B' and the cross track and track angle errors with respect to the outbound track are utilized for the computations resulting in a steering signal that rolls the aircraft level at the point B in a smooth transition from the curved path to the next leg. Since the cross track and track angle errors are computed with respect to the predetermined curved path and are displayed on the HSI, the pilot is permitted to maintain the lateral deviation and heading command bug aligned, thereby allowing for manual leg-to-leg transitions without overshoot or undershoot of the next leg. Therefore, the RNAV system utilizing the present invention provides controlled guidance during the transition from one leg to the next of the aircraft flight plan. By thus providing a "steered" turn, the pilot is better able to maintain cognizance of his position when transitioning from one track to another, especially if track changes occur often, as in terminal areas with the track during transition being accurately controlled. This type of controlled guidance may become a requirement of aviation regulatory agencies for RNAV systems to provide accurate spacing of aircraft during turns as well as on straight legs.

Thus the present invention achieves steering the aircraft through the transition from one RNAV leg to the next using minimum air space with a smooth easily identifiable manual and/or automatic command. The desired aircraft bank limits, velocity and transition heading change are utilized to compute the curved path which is tangential to both RNAV legs at the entrance and exit points of the planned maneuver. Additionally, the present invention reduces overshoot and eliminates large deviation presentations to the pilot by providing an easily definable RNAV leg transition. The curved path is completely predictable and therefore air space tolerances are defined along the curved path. The invention, therefore, eliminates the large unpredictable air space due to "S" turning and overshoots necessitated in present day systems.

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. In an area navigation system for aircraft, apparatus for transitioning the aircraft from an inbound course to an outbound course of a waypoint comprising
    bank bias means for generating a predetermined bank angle command signal for rolling said aircraft to a predetermined desired bank attitude,
    curved path means for computing a circular path from said inbound course to said outbound course tangentially thereto and having a turn radius in accordance with said bank angle command signal, and
    deviation means for generating deviation signals with respect to said circular path for constraining said aircraft to fly said circular path in transitioning from said inbound to said outbound course.

2. The apparatus of claim 1 in which said curved path means comprises
    turn center means for generating turn center signals for said circular path,
    turn radius means coupled to said bank bias means for generating a turn radius signal for said circular path in accordance with said bank angle command signal, and
    angular position means responsive to said turn center signals for generating an angular position signal representative of the angular position of said aircraft on said circular path.

3. The apparatus of claim 2 in which said turn center means comprises
    difference means for providing a difference signal representative of the difference between said inbound and outbound courses,
    distance means responsive to said turn radius signal and said difference signal for providing a distance signal representative of the distance of said waypoint to the point of tangency of said circular path on said inbound course, and
    turn center computing means responsive to said distance signal, said turn radius signal and a signal representative of said inbound course for generating said turn center signals in accordance therewith.

4. The apparatus of claim 3 in which
    said difference means comprises means for computing the function $$\Delta \psi = \psi_2 - \psi_1,$$

said distance means comprises means for computing the function $$d = TR \tan \frac{\Delta \psi}{2},$$

and
said turn center computing means comprises means for computing the function $$NTCW = -d \cos \psi_1 - TR \sin \psi_1$$

$$ETCW = -d \sin \psi_1 + TR \cos \psi_1$$

where
$\psi_1, \psi_2$ = said inbound and outbound courses respectively
$\Delta \psi$ = said difference signal
$TR$ = said turn radius signal
$d$ = said distance signal
$NTCW, ETCW$ = said turn center signals representing the north and east coordinates of said turn center with respect to said waypoint respectively.

5. The apparatus of claim 3 further including
VOR/DME computing means for providing first position signals representative of the position of said aircraft with respect to a VOR/DME station,
waypoint computing means for providing second position signals representative of the position of said waypoint with respect to said VOR/DME station, and
combining means responsive to said first and second position signals and said turn center signals for providing further position signals representative of the position of said aircraft with respect to said turn center,
said angular position means being responsive to said further position signals for generating said angular position signal.

6. The apparatus of claim 5 in which said combining means comprises
first combining means for combining said first and second position signals for providing third position signals representative of the position of said aircraft with respect to said waypoint, and
second combining means for combining said third position signals and said turn center signals for providing said further position signals.

7. The apparatus of claim 6 in which
said difference means comprises means for computing the function $$\Delta \psi = \psi_2 - \psi_1$$

said distance means comprises means for computing the function $$d = TR \tan \frac{\Delta \psi}{2},$$

and
said turn center computing means comprises means for computing the function $$NTCW = -d \cos \psi_1 - TR \sin \psi_1$$

$$ETCW = -d \sin \psi_1 + TR \cos \psi_1$$

where
$\psi_1, \psi_2$ = said inbound and outbound courses respectively $\Delta \psi$ = said difference signal
$TR$ = said turn radius signal
$d$ = said distance signal
$NTCW, ETCW$ = said turn center signals representing the north and east coordinates of said turn center with respect to said waypoint respectively.

8. The apparatus of claim 7 in which
said VOR/DME computing means comprises means for providing first position signals NAV and EAV representative of the north and east coordinates respectively of said position of said aircraft with respect to said VOR/DME station,
said waypoint computer means comprises means for providing second position signals NWV and EWV representative of the north and east coordinates respectively of said position of said waypoint with respect to said VOR/DME station,
said first combining means comprises means for computing the function $$NAW = NAV - NWV$$
$$EAW = EAV - EWV,$$

and
said second combining means comprises means for computing the function $$NTCA = NTCW - NAW$$

$$ETCA = ETCW - EAW$$

where
$NAW, EAW$ = said third position signals representing the north and east coordinates respectively of said position of said aircraft with respect to said waypoint and
$NTCA, ETCA$ = said further position signals representing the north and east coordinates respectively of said position of said aircraft with respect to said turn center.

9. The apparatus of claim 8 in which said angular position means comprises means for computing the function $$\theta_1 = \tan^{-1} \frac{NTCA}{ETCA}$$

where
$\theta_1$ = said angular position signal.

10. The apparatus of claim 9 including further VOR/DME computing means for providing a track angle signal representative of the track angle of said aircraft.

11. The apparatus of claim 10 in which said deviation means comprises
cross track error means responsive to said further position signals and said turn radius signal for generating a cross track error signal in accordance therewith with respect to said curved path,
track angle error means responsive to said angular position signal and said track angle signal for generating a track angle error signal in accordance therewith with respect to said curved path, and
steering signal means responsive to said cross track error signal, said track angle error signal and said bank bias command signal for providing a steering signal in accordance therewith with respect to said curved path, said cross track error signal, said track angle error signal and said steering signal comprising said deviation signals.

12. The apparatus of claim 11 in which said cross track error means comprises means for computing the function $$XTK = TR - \sqrt{NTCA^2 + ETCA^2} \text{ for clockwise turns}$$

$$XTK = \sqrt{NTCA^2 + ETCA^2} - TR \text{ for counterclockwise turns,}$$

said track angle error means comprises means for computing the function $$TKE = (\theta_1 + 90°) - \text{TRACK ANGLE for clockwise turns}$$

$$TKE = (\theta_1 - 90°) - \text{TRACK ANGLE for counterclockwise turns,}$$

and said steering signal means comprises means for computing the function $$\phi_c = \phi_m + k_1 \, XTK + k_2 \, TKE$$

where
$XTK$ = said cross track error signal
$TKE$ = said track angle error signal
TRACK ANGLE = said track angle of said aircraft
$\phi_c$ = said steering signal
$\phi_m$ = said bank angle command signal
$k_1, k_2$ = gain terms.

13. The apparatus of claim 5 including further VOR/DME computing means for providing a track angle signal representative of the track angle of said aircraft.

14. The apparatus of claim 13 in which said deviation means comprises
cross track error means responsive to said further position signals and said turn radius signal for generating a cross track error signal in accordance therewith with respect to said curved path,
track angle error means responsive to said angular position signal and said track angle signal for generating a track angle error signal in accordance therewith with respect to said curved path, and
steering signal means responsive to said cross track error signal, said track angle error signal and said bank bias command signal for providing a steering signal in accordance therewith with respect to said curved path,
said cross track error signal, said track angle error signal and said steering signal comprising said deviation signals.

15. The apparatus of claim 2 in which said turn radius means comprises
means for providing a velocity signal representative of the speed of said aircraft, and means for providing said turn radius signal in accordance with said bank angle command signal and said velocity signal.

16. The apparatus of claim 15 in which said turn radius means comprises means for computing the function $$TR = \frac{V^2}{g \tan \phi_m}$$

where
$TR$ = said turn radius signal
$V$ = said velocity signal
$\phi_m$ = said bank angle command signal
$g$ = the gravity constant.

17. The apparatus of claim 1 in which said deviation means comprises
cross track error means coupled to said curved path means for generating a cross track error signal with respect to said curved path,
track angle error means coupled to said curved path means for generating a track angle error signal with respect to said curved path, and
steering signal means responsive to said cross track error signal, said track angle error signal and said bank bias command signal for providing a steering signal in accordance therewith with respect to said curved path,
said cross track error signal, said track angle error signal and said steering signal comprising said deviation signals.

18. The apparatus of claim 17 further including an automatic flight control system responsive to said steering signal for controlling said aircraft about the roll axis thereof in response to said steering signal.

19. The apparatus of claim 17 further including a flight director system responsive to said steering signal and including an attitude director indicator with the lateral steering cue thereof driven by said steering signal.

20. The apparatus of claim 17 further including a horizontal situation indicator responsive to said cross track error signal and said track angle error signal with the lateral deviation and the commanded heading cues thereof driven by said cross track error signal and said track angle error signal respectively.

21. The apparatus of claim 1 in which said bank bias means comprises
means for providing a velocity signal representative of the speed of said aircraft,
difference means for providing a difference signal representative of the difference between said inbound and outbound courses, and
bank bias function means responsive to said velocity signal and said difference signal for providing said bank angle command signal in accordance therewith.

* * * * *